July 24, 1951 J. DOUSA 2,561,789
PNEUMATIC CHUCK FOR AUTOMATIC TURRET LATHES
Filed Jan. 15, 1949
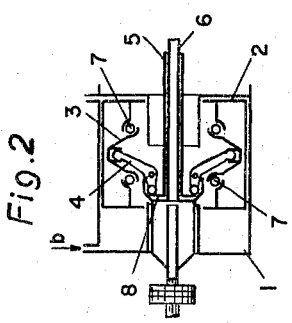
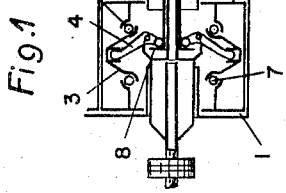
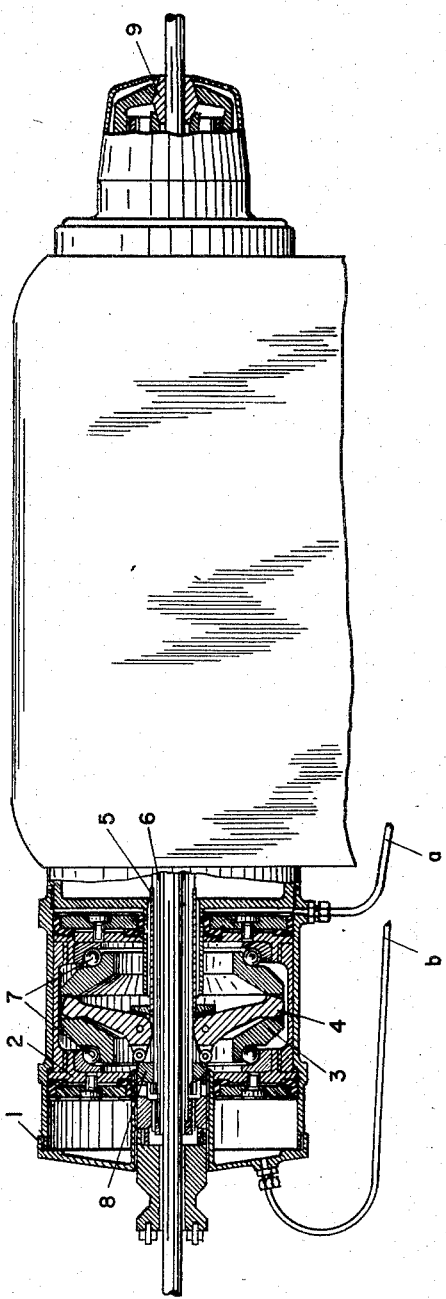
INVENTOR
Jaroslav Dousa
BY Patented July 24, 1951

2,561,789

UNITED STATES PATENT OFFICE 2,561,789

PNEUMATIC CHUCK FOR AUTOMATIC TURRET LATHES

Jaroslav Doušа, Dobrany, Czechoslovakia, assignor to Skoda Works, National Corporation, Plzen, Czechoslovakia Application January 15, 1949, Serial No. 71,191
In Czechoslovakia February 2, 1948

2 Claims. (Cl. 279—4)

This invention relates to chucks and, more particularly, to an improved pneumatic or air operated chuck for lathes.

The increased outputs required of lathes resulting from the use of hard metal tools necessitates the use of a more efficient clamping device or chuck in consequence of the greater pressures due to the high cutting speeds. The hitherto known pneumatic chucks, while operating efficiently and dependably at the previously used lower cutting speeds and pressures are inadequate at the high angular velocities and high cutting pressures frequently used at present. This inadequacy of prior art air chucks is mainly due to the fact that the working piston which is exposed to pressure throughout the duration of clamping rotates with the spindle increasing thus substantially, due to its large diameter necessary for exerting a sufficient clamping force, the inertia forces of the spindle box, such substantial increase of the inertia forces resulting in a very undesirable overloading of the motor on starting and braking of the latter.

Moreover, the air feed into the rotating working cylinder can be effected only with considerable difficulties, as packing of the respective elements is difficult, thus causing air losses. Additionally jamming of the air feed socket at high speeds is often liable to occur.

All the above mentioned drawbacks are eliminated in the pneumatic holding device or air operated chuck according to the present inventions, and which is characterized by the following outstanding novel features: The operating force is exerted by a fixed cylinder which has air pressure applied to its axially movable operating piston only during the actual clamping and releasing operations. The actual holding or gripping is maintained by chucking fingers, operated by the piston, and being self-locking when so operated. In addition, the operating mechanism is characterized by ease of operation and control.

With the foregoing in mind, it is an object of the present invention to provide an improved air operated chuck for lathes or the like.

Another object is to provide such a chuck including a non-rotatable operating cylinder having an axially movable piston, and self-locking chuck operating fingers whereby the cylinder need be energized only during the clamping and release movements and need not be energized during the chuck holding time.

These, and other objects, advantages and novel features of the invention will be apparent from the following description and the accompanying drawing.

In the drawing:

Figs. 1 and 2 are schematic views illustrating the principles of the invention.

Fig. 3 is an elevation view, partly in section, of a practical embodiment of the invention.

In Fig. 1, the mechanism is shown in a position where the chucking device is released by introducing pressure air in a direction $a$. The piston 2, moving inside the fixed cylinder 1, is then in its extreme left-hand position. A sleeve 3 is rotatably mounted within piston 2 on ball bearings 7, and is secured to rotate with the spindle 5 and chuck operating thrust tube 6. Within sleeve 3 are mounted bell crank chucking fingers 4, which are pivotally supported by a member secured to spindle 5. The outer ends of the longer arms of bell cranks 4 are engaged in peripheral openings in the medial portion of sleeve 3, whereas the ends of the shorter arms of the bell cranks bear against jaws or claws 8 secured to thrust tube 6.

Thrust tube 6 is axially movable relative to spindle 5. Consequently, rocking of cranks 4, which are pivoted on spindle 5, will move jaws 8 attached to tube 6. Thus, tube 6 will be moved axially to operate the chuck 9 (Fig. 3). In Fig. 1, with piston 2 at its extreme left-hand or outer position, the bell cranks 4 have been swung by sleeve 3 to a position substantially releasing claws 8, so that tube 6 can move to the right to release chuck 9.

By introducing pressure air in a direction $b$ (see Fig. 2), the piston 2 is moved into its extreme righthand position carrying with it the sleeve 3. The chucking fingers, by means of the engagement of sleeve 3 with their longer arm, are rocked to a position in which the axes of their shorter arms are parallel to the axis of the spindle 5 whereby a self-locking arrangement of the holding cranks 4 is attained, the shorter arms of the chucking fingers being stressed in an axial direction. In the position of Fig. 2, jaws 8 and tube 6 are moved to the right to engage the chuck.

The movement of the chucking fingers 4 held in the attachment of said thrust tube 6 is transmitted by the latter to the cone encircling the chuck 9 which latter thus holds firmly the material to be machined, as is clear from Fig. 3 illustrating a practical embodiment of the invention.

The chucking range is sufficient even for rolled material and the whole device functions dependably even at high angular velocities, such as 6000 R. P. M. or greater.

While a specific embodiment of the invention has been shown and described in detail to illustrate the application of the invention principles, it should be understood that the invention may be otherwise embodied without departing from such principles.

I claim:

1. In a machine having a rotating spindle, a chuck operatively associated with the spindle, and a chuck operating element movable axially relative to the spindle, chuck operating mechanism comprising in combination, a stationary fluid pressure cylinder; a piston non-rotatably mounted in said cylinder and coaxially embracing said spindle; means for selectively admitting pressure fluid to said cylinder to move said piston axially relative to the spindle; radially swingable bell cranks pivotally mounted on said spindle within said piston and each having a first arm and a second arm extending from the pivot axis; a sleeve rotatably mounted within said piston and fixed against axial movement relative thereto, said sleeve being engaged with said first arms; and abutment means fixed to said operating element, said second arms being engageable with said abutment means; said piston and sleeve being movable between a first position in which said second arms are parallel to the spindle axis and force said abutment means and element to a chuck operated position, and a second position in which said bell cranks are rocked by said sleeve to a position substantially releasing said abutment means.

2. Chuck operating mechanism as claimed in claim 1 in which said operating element comprises a tubular element coaxial with the spindle.

JAROSLAV DOUŠA.

REFERENCES CITED

The following references are of record in the file of this patent:

UNITED STATES PATENTS

| Number | Name | Date |
|---|---|---|
| 1,608,463 | Cutler | Nov. 23, 1926 |
| 1,869,445 | Tomkins | Aug. 2, 1932 |
| 2,392,999 | Redmer | Jan. 15, 1946 |
| 2,455,663 | Eaton | Dec. 7, 1948 |
| 2,462,284 | Rauch | Feb. 22, 1949 |

FOREIGN PATENTS

| Number | Country | Date |
|---|---|---|
| 420,616 | Great Britain | Dec. 5, 1934 |